Patented Mar. 8, 1927.

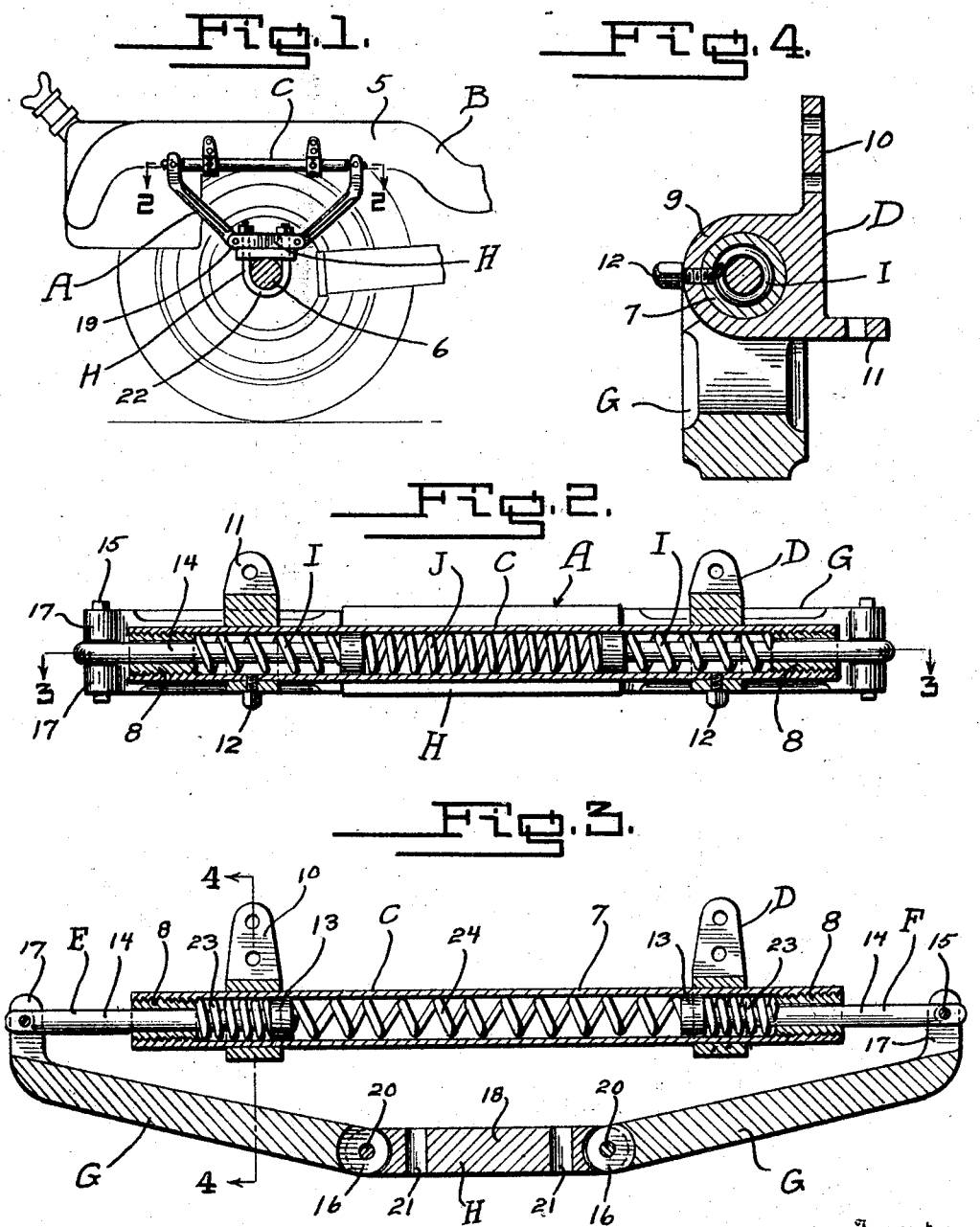

1,620,070

UNITED STATES PATENT OFFICE.

CHARLES H. BUCKLER, OF CAMDEN, NEW JERSEY.

SPRING SUSPENSION.

Original application filed February 4, 1922, Serial No. 534,191. Divided and this application filed October 28, 1925. Serial No. 65,431.

The present invention relates to motor vehicles, and more particularly to resilient suspension means therefor, and is a division of application Serial Number 534,191, filed February 4, 1922, now Patent No. 1,563,335 dated December 1, 1925.

The primary object of the invention is to provide a novel means of resiliently connecting the supporting axle with the chassis or frame of the vehicle, whereby the use of leaf springs now universally in vogue will be dispensed with, thereby eliminating the inconveniences contingent therewith such as the breakage thereof under rebound and the difficulty experienced with the proper lubrication thereof.

A further object of the invention is to provide an improved type of spring suspensions for vehicles, in which the shock will be effectively alleviated or absorbed and which will eliminate the use of the so-called shock absorbers now on the market which add to the cost of the car, and in which rebound after shock will be effectively taken care of.

A further object of the invention is the provision of novel means for operatively connecting the vehicle axle by the use of levers, with plungers associated with the chassis, and novel means for cushioning and checking the travel of the plungers.

A further object of the invention is the provision of an improved spring suspension for vehicles embodying a cylinder or cylinders connected with the vehicle chassis, plungers slidably mounted in the cylinder or cylinders, shock and rebound absorbing means, such as helical springs mounted in the cylinders for acting against said plungers, and levers or arms connected to the plungers and to the vehicle axles, the levers being associated with the axles and plungers in such a manner that the active travel of the plungers will be considerably less than the active vertical travel of the axles when encountering an obstruction during travel of the vehicle.

A still further object of the invention is to provide an improved spring suspension for motor vehicles, which will be durable when taken in use, one that will be simple and easy to manufacture, one that can be incorporated with existing machines, as well as those in the course of manufacture, and one which will add to the appearance of the car.

Other objects and advantages of the invention will be apparent during the course of the following detailed description, taken in connection with the accompanying drawing forming a part of this specification, and in which drawing:

Figure 1 is a side elevation of the rear portion of a motor vehicle chassis, showing the improved spring suspension connected thereto, and with parts of the chassis shown in section.

Figure 2 is an enlarged horizontal longitudinal section through the improved spring suspension, on line 2—2 of Figure 1.

Figure 3 is a vertical longitudinal section on line 3—3 of Figure 2, showing the position of the various elements when under shock; and, Figure 4 is an enlarged transverse section through the improved spring suspension taken on line 4—4 of Figure 3, illustrating the manner of mounting the supporting cylinders in the attaching bracket, and the means for connecting the spring suspension to the motor vehicle chassis frame.

Referring to the drawing in detail, and wherein similar reference characters designate corresponding parts throughout the several views, the letter A indicates the improved suspension, and B a vehicle chassis with which the same can be associated.

While in the drawing, but one of the improved devices has been shown connected to the rear end of the chassis, it is to be understood that two of the suspension structures are disposed at each end of the chassis for supporting the frame of the chassis upon the running gear of the vehicle.

While the chassis B has been merely shown to illustrate the improved suspension, the same can be of any type, and as shown includes the side channel beams 5, and the rear axle structure 6.

The improved suspension A includes the housing C; means D for connecting the same to the chassis B; plungers E and F mounted in the housing C; the supporting and shock distributing levers G; the axle connecting means H; and the shock and rebound absorbing and cushioning means I and J respectively.

The housing C, by way of example, has been shown to consist of a cylinder 7, which is disposed longitudinally of the chassis, and into the opposite ends of which bearings or guides 8 are threaded for slidable mounting of the plungers E and F. As shown, these guides 8 are threaded into the ends of the cylinder, although the same may be connected thereto in any preferred manner.

Referring now to the means D used for connecting the cylinder 7 to the channel beam of the chassis, the same consists of sleeves 9 surrounding the cylinder, and which are preferably disposed adjacent to each end of the cylinder. These sleeves 9 are provided with attaching brackets or plates 10 and 11, which can either be riveted, bolted, or otherwise secured to the side beams 5 of the chassis. These sleeves 9, can be secured to the cylinder in any preferred manner, and as shown, set screws 12 are provided for this purpose, and which screws may extend entirely through the sleeves and into the cylinder as clearly illustrated in Figures 2 and 4.

The plungers E and F which are of identical construction, and which are mounted at each end of the cylinder 7, include heads 13 and stems or rods 14 which extend through the bearings 8 and project outwardly from the opposite ends of the cylinder 7. The terminals of the rods or stems 14 are pivotally connected to the shock distributing levers G by means of pivot pins 15.

The supporting and shock distributing levers G, which are of identical construction, are disposed on opposite sides of the transverse center of the cylinder 7, and have their inner ends reduced in width to provide lugs 16, while their outer ends are provided with upwardly extending substantially right angularly disposed ears 17. These ears 17 are adapted to embrace the opposite sides of the rods 14 adjacent the outer ends thereof, and these ears 17 can be provided with openings for the reception of the pivot pins 15.

Referring now to the means H for operatively connecting the shock distributing levers G together and to the axle of the vehicle, the same consists of blocks 18 having their opposite terminals bifurcated to provide ears 19 between which the lugs 16 formed on the inner ends of the levers G are adapted to fit. These ears 19 and the lugs 16 can be provided with aligned openings for the reception of pivot pins 20. The central portion of the blocks 18 at the longitudinal axis thereof, can be provided with vertical openings 21, and these openings 21 are adapted to receive the shank portions of shackles 22, which can be extended around the axle of the vehicles, for effectively connecting the shock distributing levers G with said axle. It will be apparent that the block 18 and shackle 22 may be dispensed with, if so desired, by forming ears upon the axle for pivotal mounting of the inner ends of the shock distributing levers.

The shock absorbing means I, consists of helical expansion springs 23, which are coiled about the rods 14, with one end thereof bearing against the plunger head 13, and with the opposite end bearing against the guide 8. These expansion springs 23, and as is readily apparent, normally urge the plunger E toward one another or toward the central portion of the cylinder 7.

The rebound cushioning means J consists of a helical spring 24 which is disposed between the heads 13, and which spring will effectively cushion the rebound. This spring 24 is preferably under sufficient tension so as to remain in contact with the heads 13 during outward movement of the plungers E. It will be obvious that when a shock is transmitted to the block 18, that the same will be forced upwardly in a vertical path, thus tending to force apart the arms G, and which will in turn draw outwardly on the plungers E thus tending to compress the expansion springs 23. Thus the springs 23 will check the travel of the outward movement of the plungers E and F for effectively absorbing a shock delivered to the block 18. When the plungers E and F tend to resume their normal position, the heads 13 thereof will act against the spring 24, in a manner for effectively checking the inward travel of the plungers and thus prevent any rebound.

From the foregoing description, it can be seen that an exceptionally simple spring suspension for vehicles has been provided, in which the use of leaf springs is entirely eliminated, and in which the shock and rebound is entirely taken care of by helical springs which is transmitted thereto by novel shock distributing levers which are connected to the vehicle axle.

Changes in detail may be made to the specific form of the invention herein shown and described, without departing from the spirit of the invention or the scope of the claim.

I claim:—

In a motor vehicle, the combination with the chassis thereof including a frame and axle, of resilient suspension means for connecting the frame and axle, said suspension means comprising, a cylinder, pistons in said cylinder and rods for said pistons extending in opposite directions out of the cylinder, end bearings in the cylinder, guiding said piston rods, a coil spring between said pistons, a coil spring for each piston disposed between it and its respective end bearing, sleeves secured to the chassis frame and embracing said cylinder adjacent said bearings for securing the cylinder in spaced relation longitudinally of the frame, and links in converging relation from the outer ends of said piston rods and connecting the same to the axle.

CHARLES H. BUCKLER.